United States Patent [19]

Berry

[11] Patent Number: 5,005,524
[45] Date of Patent: Apr. 9, 1991

[54] PET FEED BOWL CONSTRUCTION

[76] Inventor: Nancy K. Berry, 1980 W. Hibbard, Owosso, Mich. 48867

[21] Appl. No.: 486,286

[22] Filed: Feb. 28, 1990

[51] Int. Cl.⁵ .............................................. A01K 7/00
[52] U.S. Cl. ................................... 119/51.11; 119/73; 119/61; 219/438
[58] Field of Search ............ 119/51.11, 61, 73, 51.12; 219/436, 438, 446, 447, 486, 532

[56] References Cited

U.S. PATENT DOCUMENTS

| | | | |
|---|---|---|---|
| 1,843,455 | 2/1932 | McGowen | 219/436 |
| 2,230,085 | 1/1941 | Ortgiesen | 119/73 X |
| 2,584,301 | 2/1952 | Sinclair | 119/61 |
| 2,677,350 | 5/1954 | Prestidge et al. | 119/61 |
| 3,170,439 | 2/1965 | Juenger | 119/73 |
| 3,631,840 | 1/1972 | McCormack | 119/51.12 |
| 4,561,384 | 12/1985 | Liff | 119/73 |
| 4,655,171 | 4/1987 | Tomasovich | 119/73 |

FOREIGN PATENT DOCUMENTS

| | | | |
|---|---|---|---|
| 0762539 | 4/1934 | France | 219/436 |
| 2423150 | 12/1979 | France | 119/51.12 |
| 0314030 | 6/1929 | United Kingdom | 219/436 |

Primary Examiner—Robert P. Swiatek
Assistant Examiner—Todd E. Manahan
Attorney, Agent, or Firm—Leon Gilden

[57] ABSTRACT

An apparatus including a pet watering dish including an upper cavity and a lower cavity wherein the lower cavity receives in a complementary manner a plate warmer therewithin. The plate warmer includes a plurality of heating coils operative in concert or individually for selective heating of the upper bowl cavity. A modification of the instant invention includes an exterior bowl wall positioned exteriorly of an interior bowl wall to define an internal fluid containing cavity therebetween with an exterior fluid moat defined between the exterior wall and the interior wall to prevent crawling insects from contamination of the interior bowl cavity. A heating element is positioned underlying the floor of the bowl.

1 Claim, 4 Drawing Sheets

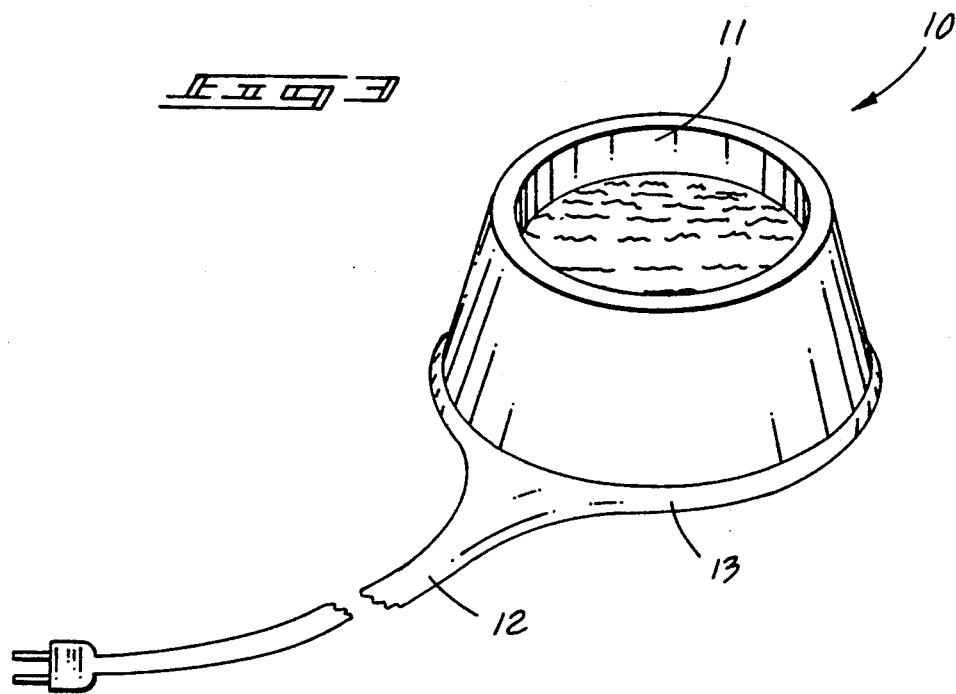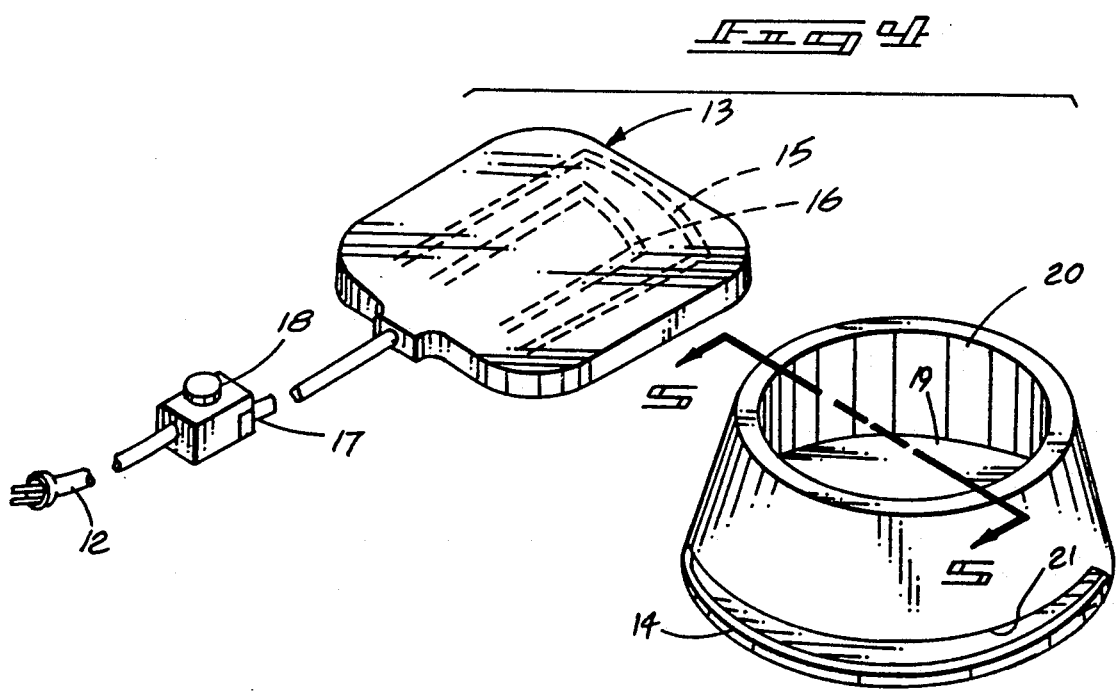

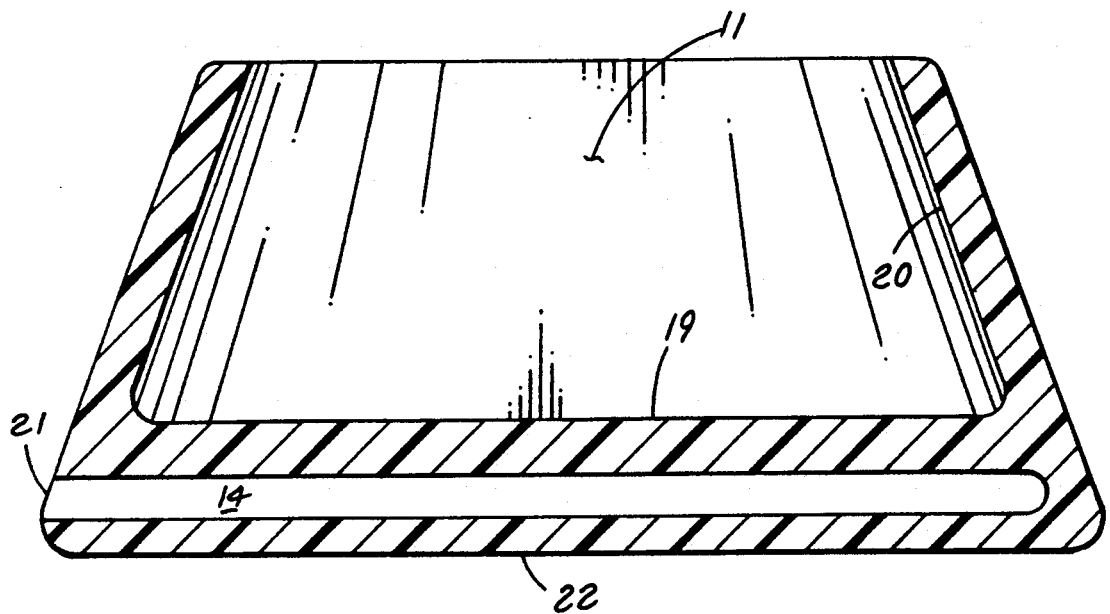
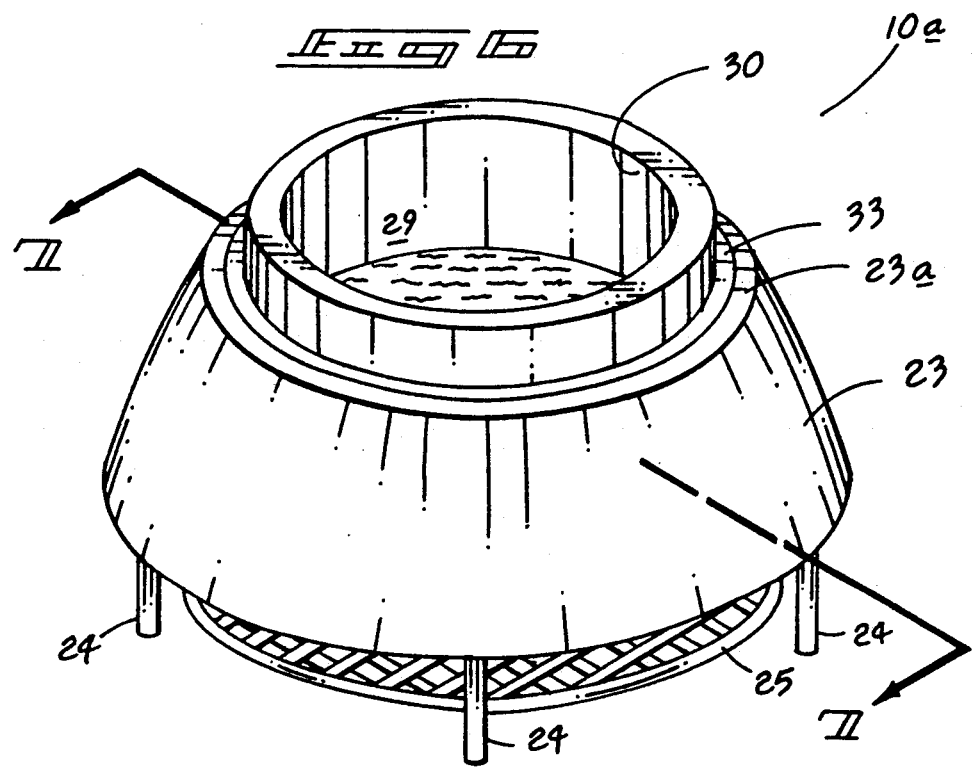

PET FEED BOWL CONSTRUCTION

BACKGROUND OF THE INVENTION

1. Field of the invention

The field of the invention relates to pet watering dishes, and more particularly pertains to a new and improved pet feed bowl construction wherein the same permits selective heating of an interior cavity of the bowl for selective heating thereof to prevent freezing during periods of depressed temperature conditions.

2. Description of the Prior Art

Pet feeding and watering dishes of various types have been utilized throughout the prior art. Various heating elements and the like have been utilized in the prior art but heretofore have failed to provide the convenient and effective combination of elements cooperative in a synergistic inter-relationship as set forth by the instant invention to provide a pet watering bowl utilizing selective heating of the bowl cavity by one or a plurality of heating elements. Examples of the prior art include U.S. Pat. No. 4,798,173 to WILGREN wherein a pet feed dish includes an integral coolant to prevent spoilage of food within the dish wherein a removable transparent cover overlies an exterior wall of the dish to permit a pet to pivotally open the cover for access to the food within the dish.

U.S. Pat. No. 4,691,664 to CROWELL sets forth a dish-like receptacle wherein a coolant within the receptacle source contains a liquid at a reduced temperature wherein the coolant source is typically a freezable gel underlying a cavity of the dish.

U.S. Pat. No. 4,827,874 to MAHAN sets forth a heated electrical feeding dish preventing insects from gaining access to the pet food or water supply. Electrical contacts are directed at spaced intervals about the sides of the dish to electrify insects crawling about the dish attemping to gain access to the interior thereof.

U.S. Pat. No. 4,270,490 to KOPP illustrates a plurality of feed bowls one acting as a cover for the other in a cooperative manner for use of the bowls in a plural food dispensing procedure.

U.S. Pat. No. 4,357,905 to CARPENTER sets forth a pet feeder including a receptacle providing a moat when a food dish is positioned within the receptacle to prevent insects from gaining access to the interior of the food bowls.

As such, it may be appreciated that there continues to be a need for a new and improved pet feed bowl construction wherein the same addresses both the problems of ease of use as well as affectiveness in construction and maintaining pet fluids at elevated temperatures to prevent freezing thereof in a sanitary and conveniently utilized organization.

SUMMARY OF THE INVENTION

In view of the foregoing disadvantages inherent in the known types of pet feed bowls now present in the prior art, the present invention provides an improved pet feed bowl construction wherein the same permits pet drinking fluids to be maintained at temperatures above freezing. As such, the general purpose of the present invention, which will be described subsequently in greater detail, is to provide a new and improved pet feed bowl construction which has all the advantages of the prior art pet bowl construction and none of the disadvantages.

To attain this, the pet feed bowl construction of the instant invention includes an apparatus including a pet watering dish including an upper cavity and a lower cavity wherein the lower cavity receives in a complementary manner a plate warmer therewithin. The plate warmer includes a plurality of heating coils operative in concert or individually for selective heating of the upper bowl cavity. A modification of the instant invention includes an exterior bowl wall positioned exteriorly of an interior bowl wall to define an internal fluid containing cavity therebetween with an exterior fluid moat defined between the exterior wall and the interior wall to prevent crawling insects from contamination of the interior bowl cavity. A heating element is positioned while underlying the floor of the bowl.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet feed bowl construction which has all the advantages of the prior art pet feed bowl construction and none of the disadvantages.

It is another object of the present invention to provide a new and improved pet feed bowl construction which may be easily and efficiently manufactured and marketed.

It is a further object of the present invention to provide a new and improved pet feed bowl construction which is of a durable and reliable construction.

An even further object of the present invention is to provide a new and improved pet feed bowl construction which is susceptible of a low cost of manufacture with regard to both materials and labor, and which accordingly is then susceptible of low prices of sale to the consuming public, thereby making such pet feed bowl construction economically available to the buying public.

Still yet another object of the present invention is to provide a new and improved pet feed bowl construction which provides in the apparatuses and methods of the prior art some of the advantages thereof, while simultaneously overcoming some of the disadvantages normally associated therewith.

Still another object of the present invention is to provide a new and improved pet feed bowl construction which may be compactly stored when not being utilized.

Yet another object of the present invention is to provide a new and improved pet feed bowl construction wherein the same permits maintaining of pet drinking fluids at elevated temperatures within the bowl and further limits access of insects and the like from access to the bowl.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an exploded isometric illustration of the instant invention, its components, and their relationship.

FIG. 5 is an orthographic cross-sectional view taken along the lines 5—5 of FIG. 4 in the direction indicated by the arrows.

FIG. 6 is an isometric illustration of a modified pet feed bowl construction utilized by the instant invention.

DESCRIPTION OF THE PREFERRED EMBODIMENT

Figure 1:
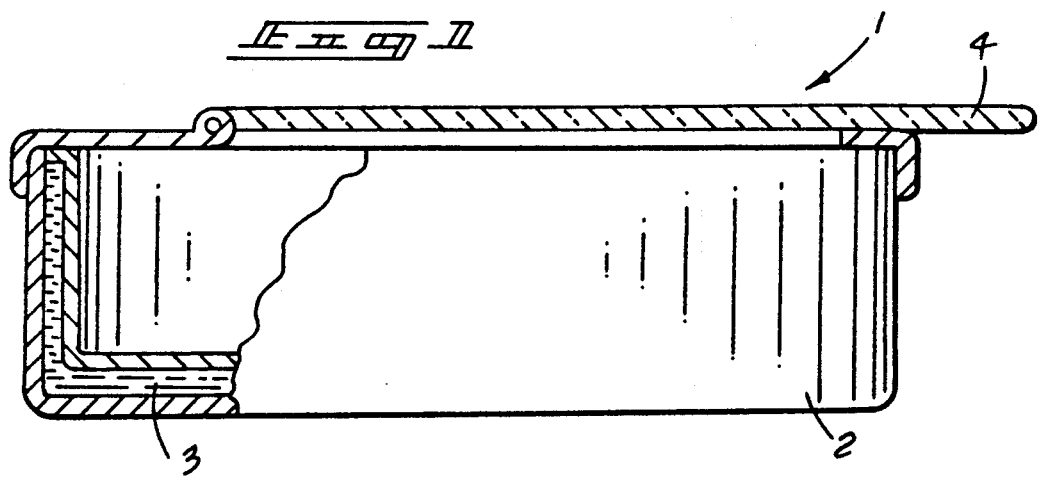
FIG. 1 is an orthographic side view taken in elevation, partially in section, of a prior art pet feed bowl construction.

With reference now to the drawings, and in particular to FIGS. 1 to 8 thereof, a new and improved pet feed bowl construction embodying the principles and concepts of the present invention and generally designated by the reference numerals 10 and 10a will be described.

FIG. 1 is illustrates a prior art pet feed dish construction 1 wherein a bowl 2 includes a cavity 3 defined between spaced walls to include a freezable material therewithin to maintain foods contained within the bowl cavity at temperatures to minimize spoilage thereof. A transparent lid 4 is pivotally mounted overlying the cavity of the bowl to enable visual observation of food contained therewithin by a pet with an overhang by the lid 4 over the bowls to permit a pet to pivot the transparent lid about its hinge to gain access to food.

Figure 2:
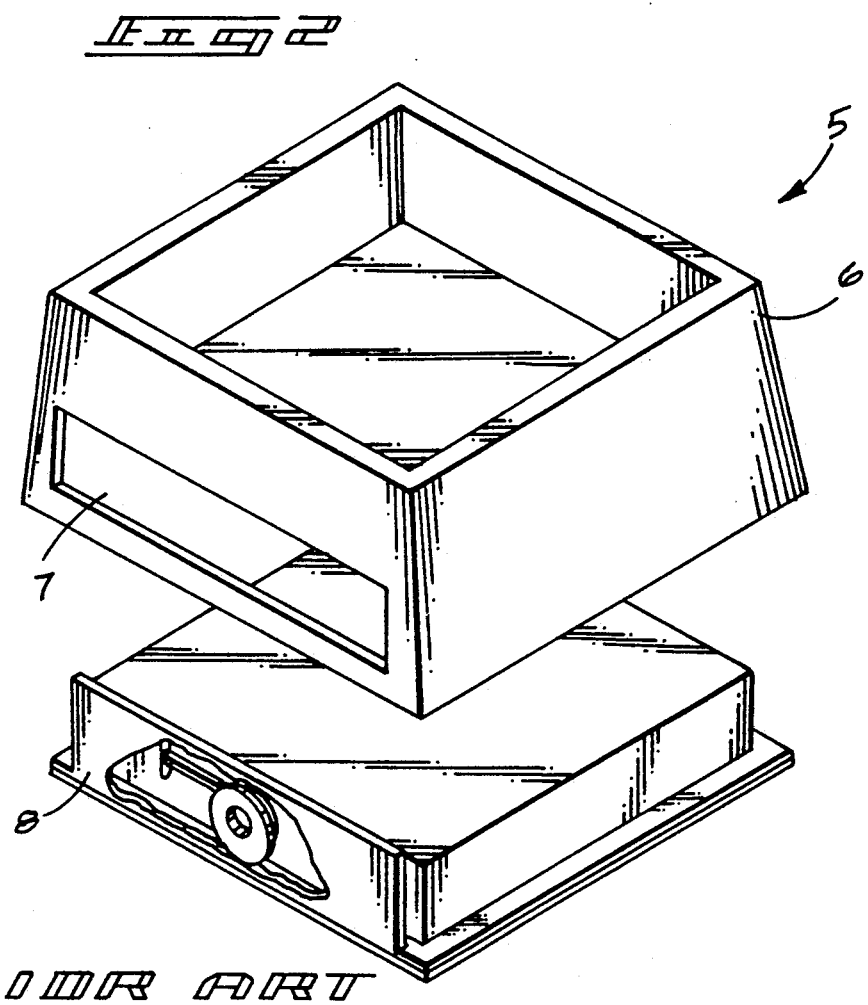
FIG. 2 is an isometric illustration of a pet feed bowl construction utilized by the prior art.
Figure 7:
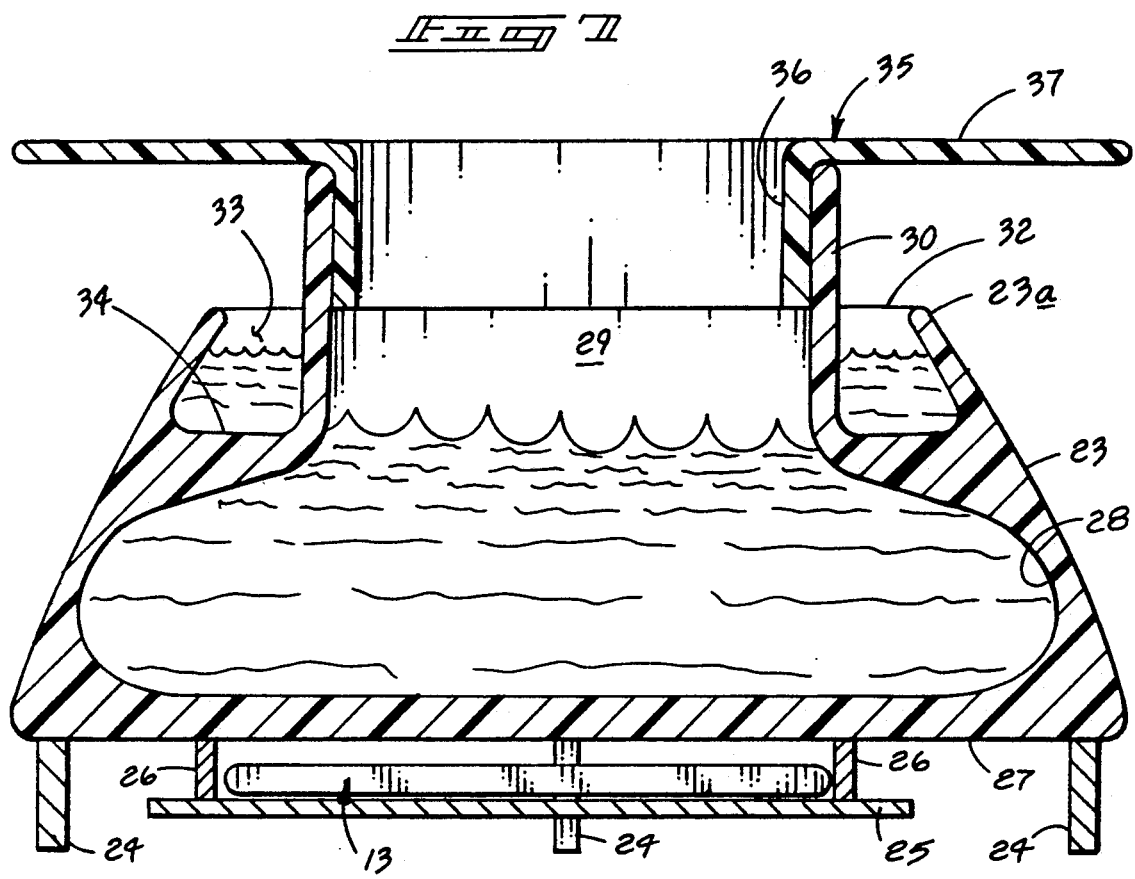
FIG. 7 is an orthographic cross-sectional view taken along the lines 7—7 of FIG. 6 in the direction indicated by the arrows with the inclusion of an insert mounted therewithin.
Figure 8:
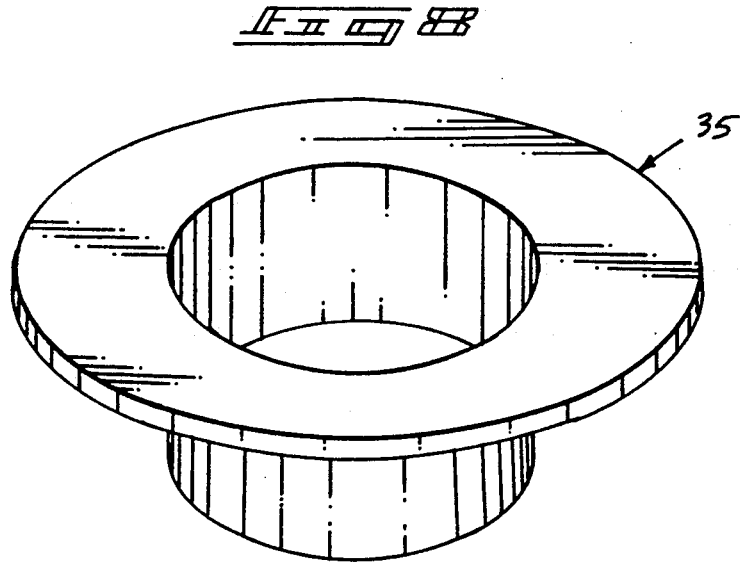
FIG. 8 is an isometric illustration of the insert as illustrated in FIG. 7.

FIG. 2 includes a further illustration of a pet feed dish construction 5 wherein a bowl 6 including an opening overlies an insert 8 provided with a freezable gel and the like to maintain foods at lower temperatures to minimize spoilage of such foods.

FIG. 3 illustrates the pet feed bowl construction 10 of the instant invention which essentially comprises an upper bowl cavity 11 to receive fluids and the like therewithin overlying a heating plate 13 which includes an electrical cord 12 to direct electrical current to one or both of a plurality elements defined by a first and second heating coil 15 and 16 mounted within the heating plate 13. The heating plate 13 is defined by a plate-like external configuration complementary to a lower bowl cavity 14 formed within the bowl underlying the upper bowl cavity 11 divided by an upper cavity floor 19 with an upper cavity interior conical wall 20. The heating plate 13 overlies a lower cavity floor 22 (see FIG. 5) and is receivable within lower bowl cavity 14 through an associated access slot 21 that is diametrically disposed about the lower bowl cavity 14 to define an entrance to the cavity 14. A switch 17 is actuatable to actuate element 15 alone or both elements 15 and 16 in concert. It is comtemplated that element 15 be provided of substantially 500 watt service element with the element 16 being of a 1,000 watt service element with their use dependent upon outdoor temperatures. A timer mechanism 18 permits selective actuation of the heating element 15 or both elements 15 and 16 to provide for selective timed actuation of fluid contained within the upper bowl cavity 11.

FIG. 6 illustrates a modified pet feed bowl construction 10a including a conically configured bowl body wall 23 defined about a cylindrical upper wall 30 and coaxially aligned with the bowl body wall 23 and oriented in a spaced relationship above the bowl body 23. The bowl body 23 includes an upper terminal conical flange 23a directed upwardly above the body wall 23 and extending substantially medially of the cylindrical upper wall 30 and spaced therefrom. The cylindrical wall 30 is spaced interiorly and radially of the terminal conical flange 23a to define a gap 32 therebetween including an external cavity moat 33 that includes a peripheral annular floor 34 to prevent access of insects from the cylindrical upper bowl cavity 29 and contaminating fluid contained within the elliptical lower bowl cavity 28. The elliptical lower bowl cavity 28 presents stability and an increased fluid capacity while providing access to the bowl cavity 28 through the upper cavity 29 to prevent and minimize tipage of the construction in use. The bowl construction 10a includes a series of support legs 24 orthogonally mounted to a bowl floor 27 of the elliptically tapered bowl body wall 23 with a support grid 25 spaced below the floor 27 including spacer legs 26 circumferally positioned about the grid 25 to receive the heating plate 13 in relationship between the grid 25 and the floor 27 to direct heating to the elliptical lower bowl cavity 28. An insert 35 defined by an insert cylindrical wall 36 including an external predetermined diameter substantially equal to an internal predetermined diameter defined by the cylindrical upper wall 30 is receivable within an upper cylindrical wall 30 and wherein the insert cylindrical wall 36 includes an insert annular flange 37 orthogonally and integrally mounted to an upper terminal end of the insert cylindrical wall 36 that extends beyond the upper terminal conical flange 23a to prevent access of a pet to the fluid contained within the moat 33.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet feed bowl apparatus including an upper bowl cavity defined by cylindrical interior wall and a conically tapered exterior body wall coaxially arranged about the cylindrical wall, and a fluid cavity for containing fluid defined between the conical wall and the cylindrical wall, and a heating plate including a first and second heating element underlying the upper bowl cavity, the heating plate including a timer mechanism mounted thereto for providing selective heating of the heating plate, and the heating plate and timer mechanism arranged for electrical communication relative to one another, and said first and said second heating elements mounted within the heating plate, and a switch means for selective actuation of the first and second heating elements to permit the elements to cooperate in concert or to effect actuation of the first and second heating elements individually, and wherein the cylindrical wall is arranged to extend above the exterior conical wall, said upper bowl cavity defined by a lower elliptical cavity and a cylindrical upper cavity coaxially spaced above the elliptical cavity, the fluid cavity positioned above the elliptical cavity and in surrounding relationship to the cylindrical upper cavity to impart stability to the feed bowl, and including a support grid underlying the elliptical cavity, and a floor defined coextensively between lower terminal ends of the conical exterior wall coaxially and orthogonally arranged relative to an axis defined by the conical wall and the cylindrical walls, and the support grid including a plurality of spacer legs orthogonally mounted to the floor and the spacer legs fixedly mounting the grid in a spaced relationship relative to the floor, and the heating plate selectively receivable on the grid and leg members extending below the grid spaced relative to one another at predetermined intervals and orthogonally mounted to the floor, and including an insert slidably mounted within the cylindrical wall, the insert including an insert cylindrical wall defined by an external diameter substantially equal to an internal diameter defined by the cylindrical wall, and the insert further including an annular flange orthogonally and integrally mounted to an upper terminal end of the insert cylindrical wall, the insert annular flange including an outer peripheral end extending beyond the conical flange.

* * * * *